US008015591B2

(12) United States Patent
Koppe et al.

(10) Patent No.: US 8,015,591 B2
(45) Date of Patent: Sep. 6, 2011

(54) VIDEO SIGNAL TRANSCEIVER

(75) Inventors: Rudolf Koppe, Breda (NL); Jan Eveleens, Hei-en Boeicop (NL)

(73) Assignee: GVBB Holdings S.A.R.L., Luxembourg (LU)

( * ) Notice: Subject to any disclaimer, the term of this patent is extended or adjusted under 35 U.S.C. 154(b) by 1586 days.

(21) Appl. No.: 11/181,335

(22) Filed: Jul. 8, 2005

(65) Prior Publication Data

US 2006/0026660 A1 Feb. 2, 2006

(30) Foreign Application Priority Data

Jul. 14, 2004 (FR) .................................... 04 300443

(51) Int. Cl.
H04N 7/16 (2011.01)
H04N 15/00 (2006.01)
H04N 7/18 (2006.01)

(52) U.S. Cl. .......... 725/143; 725/149; 348/47; 348/722; 348/723

(58) Field of Classification Search .................. 725/143, 725/146

See application file for complete search history.

(56) References Cited

U.S. PATENT DOCUMENTS

| 5,303,050 | A | * | 4/1994 | Nishimura et al. | ........ | 348/211.2 |
| 5,854,654 | A | * | 12/1998 | Zwahlen et al. | ........ | 348/159 |
| 6,115,159 | A | * | 9/2000 | Baker | ........ | 398/1 |
| 6,118,473 | A | * | 9/2000 | Tsunezune et al. | ........ | 348/14.12 |
| 6,438,753 | B1 | * | 8/2002 | Fegesch et al. | ........ | 725/143 |
| 7,327,959 | B2 | * | 2/2008 | Pelletier et al. | ........ | 398/139 |
| 2003/0112338 | A1 | | 6/2003 | Pelletier et al. | | |
| 2003/0210329 | A1 | * | 11/2003 | Aagaard et al. | ........ | 348/159 |

FOREIGN PATENT DOCUMENTS

JP 2003-298909 10/2003
WO WO 03/041411 5/2003

OTHER PUBLICATIONS

Search Report.

* cited by examiner

Primary Examiner — Brian Pendleton
Assistant Examiner — Jean D Saint Cyr
(74) Attorney, Agent, or Firm — Arent Fox LLP

(57) ABSTRACT

A video signal transceiver has a triax port, a baseband port, a demodulator for converting a HF video signal received at said triax port into a baseband video signal for outputting at said baseband port and at least one modulator for converting a baseband control signal received at said baseband port into a HF control signal for outputting at said triax port, a fibre-optical port, an optical receiver for converting an optical video signal received at said fibre-optical port into a baseband video signal, a switch for connecting either an output of said demodulator or of said optical receiver to a video signal line of said baseband port, and an optical transmitter for transmitting, via said fibre-optical port, an optical control signal derived from said baseband control signal.

19 Claims, 2 Drawing Sheets

VIDEO SIGNAL TRANSCEIVER

This application claims the benefit, under 35 U.S.C. §119 of French Patent Application 04300443.1, filed Jul. 14, 2004.

BACKGROUND OF THE INVENTION

The present invention relates to a video signal transceiver for transmitting and receiving video signals using a transmission line, in particular to video signal transceivers for transmitting video and control signals between a video camera and a base station.

Professional television broadcast cameras for studio and electronic film productions today use either an optical fibre or a special coaxial cable, referred to as a triax cable, for communicating with a base station where image data from one or more cameras are collected and processed. Triax transmission technology has been on the market for a long time, so that in many facilities where professional video cameras are used, for example in sport stadiums, triax cables are installed. A producer who uses triax transmission technology for recording an event can therefore bring his cameras to such a facility, install his base station, and can interconnect cameras and base station using triax cables that are already present on the location.

In order to transmit a video signal from the camera to the base station and a variety of control and feedback signals as well as operating power from the base station to the camera on a single transmission line, triax transmission technology has to use quite sophisticated and expensive interface electronics. The upcoming of high definition television (HDTV) has increased the need for bandwidth on the transmission line between camera and base station still further. It was believed that triax cables would no longer be able to meet this demand.

A particular problem is the attenuation of high frequency signal components on a triax cable. A standard definition television signal can be transmitted on a triax cable over approx. 3 km without suffering from a too serious degradation of quality. For transmitting a HDTV signal, higher frequencies have to be used, so that the loss of quality from attenuation is more pronounced, and the maximum useable length of the cable decreases to about 1500 m.

In view of these problems, it has been proposed to replace the triax cable by optical fibres, and camera and base station interfaces have been developed therefore. Specifically, US 2003/0112338 A1 discloses a television production system in which a camera outputs a baseband television signal, which is converted to an optical signal in a transceiver, which is removably connected to the camera and is adapted to communicate with a base station using an optical fibre cable.

Users have been reluctant to accept this new technology because of the lack of optical fibres installed in the field. While a producer who uses triax technology can in many places use pre-installed cables and thus save a lot of cost and labour, a user of optical fibre technology will often have to do the wiring before he can start an recording event.

This leaves the user in a dilemma. Although from the technical point of view, optical transmission technology is superior to triax because it does not suffer from bandwidth and range limitations as explained above, interfacing circuitry may be simpler than for triax, and cables may be cheaper, early adopters of this technology are confronted with problems because pre-installed optical cables are not available at many locations.

It might be contemplated to complement the system of US 2003/0112338 A1 by adding a triax transceiver, which can replace the optical transceiver in case of need. Still, a user must then have both transceivers in order to have a free choice between using triax or optical cables. This requires an additional investment. Further, the number of components and, hence, the overall weight of the system increases undesirably.

BRIEF SUMMARY OF THE INVENTION

It would therefore be desirable to provide video signal transceivers for a camera and a base station which make these suitable for use with optical and with triax cables at minimum cost and weight increase.

As far as the base station side is concerned, this goal is achieved by a video signal transceiver having a triax port, a baseband port, a demodulator for converting a HF video signal received at said triax port into a baseband video signal for outputting at said baseband port and at least one modulator for converting a baseband control signal received at said baseband port into a HF control signal for outputting at said triax port, which is characterized in that it further comprises a fibre-optical port, an optical receiver for converting an optical video signal received at said fibre-optical port into a baseband video signal, a switch for connecting either an output of said demodulator or of said optical receiver to a video signal line of said baseband port, and an optical transmitter for transmitting, via said fibre-optical port, an optical control signal derived from said baseband control signal.

The circuitry of the transceiver may be simplified if the HF control signal generated by said at least one modulator is applied not only to the triax port, but also to the optical transmitter.

In order to prevent signal reflection or other problems between the modulator on the one hand and the triax port and the optical transmitter, on the other, a switch ay be provided for selectively applying said HF control signal either to said triax port or to said optical transmitter.

As far as the camera side is concerned, the goal is achieved by a video signal transceiver having a baseband port, a triax port, a modulator for converting a baseband video signal received at said baseband port into a HF video signal for outputting at said triax port and at least one demodulator for converting a HF control signal received at said triax port into a first baseband control signal for outputting at said baseband port, which is characterized in that it further comprises a fibre-optical port, an optical transmitter for converting a baseband video signal received at said baseband port into an optical video signal for transmission at said optical port, an optical receiver for receiving, via said fibre-optical port, an optical control signal, and a switch for selectively outputting, at a control signal line of said baseband port, either the first baseband control signal or a second baseband control signal derived from said optical control signal by said optical receiver.

The circuitry of the transceiver may be simplified if said second baseband control signal is obtained from said at least one demodulator, which has an output signal of the optical receiver applied to it. In that case, the switch should be placed so as to selectively connect an input of the demodulator to the triax port or to the optical receiver. The format of the electric output signal from the optical receiver should then be identical to that of the first control signal.

In order to prevent signal reflection or other problems between the baseband port on the one hand and the optical transmitter or the modulator on the other, a further switch may be provided for selectively applying said baseband video signal either to said modulator or to said optical transmitter.

Both in a base station-side transceiver and in a camera-side transceiver, it is preferred to provide signal source detecting means for detecting a signal source connected to said triax port or to said fibre-optical port and for operating the switch so as to establish a signal connection between the baseband port and the one of triax and fibre-optical ports at which the signal is detected. Thus a user does not have to bother about adapting switch settings according to the type of transmission line to which the transceiver is connected.

If a signal is detected both at the triax port and at the optical ports, a predetermined one of the two ports should take precedence over the other, i. e. the signal detecting means should be adapted to establish the signal connection between the baseband port and a predetermined one of the triax and optical ports, preferably the optical port.

According to a first simple embodiment, the signal source detecting means comprises a photo-detector connected to said fibre-optical port and judges a signal to be present at the fibre-optical port based on the average optical power received at said photodiode.

Alternatively, said signal source detecting means comprises carrier detecting means for retrieving a carrier of a double-sideband modulated signal received at said fibre-optical port and judges a signal to be present at the fibre-optical port based on whether said carrier is retrieved or not. This type of signal source detection is more reliable than one which is simply based on power detection; moreover, it is easy and economic in realization, because such carrier detecting means are usually present anyway because they are needed for demodulation of received signals.

In such a case, the optical port od a base station transceiver preferably comprises two fibre lines, of which a first one is connected to said optical receiver, and a second one is connected to said carrier detecting means. Thus, data transmission on the first fibre line may use any convenient format and is not restricted to a double-sideband modulated type.

In a base station transceiver, in which a power supply circuit is conventionally connected to said triax port and to an electric line of said fibre-optical port so as to provide electric power to a remote signal source, a load detecting means may be provided for detecting whether an electric load is connected to one of said triax and optical ports and for operating the switch so as to establish a signal connection between the baseband port and the one of triax and fibre-optical ports at which the load is detected.

Similarly, in a camera transceiver, the switch may be operated by a voltage present at said triax port or at an electric line of said fibre-optical port so as to establish a signal connection between the baseband port and the one of triax and fibre-optical ports at which the voltage is detected.

BRIEF DESCRIPTION OF THE DRAWINGS

Further features and advantages of the present invention will become apparent from the subsequent description of embodiments thereof, referring to the appended drawings.

DETAILED DESCRIPTION OF THE INVENTION

Figure 1:
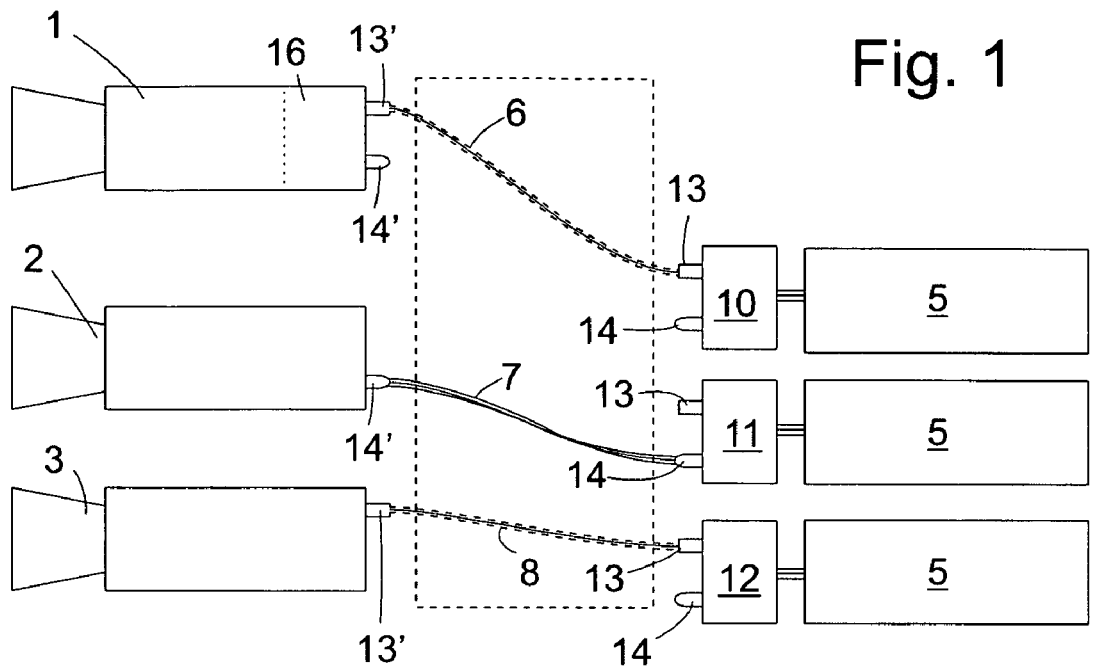
FIG. 1 is a block diagram of a TV production system in which the invention is applied.

In the diagram of FIG. 1, reference numerals 1 to 3 designate video cameras of various types, 5 indicates base stations for connecting and processing video signals from the various cameras, 6, 8 are triax cables and 7 is a fibre-optical cable. Each base station 5 has an arbitrary number n of input channels for a baseband video signal (n=3 in the example of FIG. 1), each of which is connected to a video signal transceiver 10, 11, 12 according to the present invention. Each transceiver 10, 11, 12 has a triax input port 13 and a fibre-optical input port 14 for receiving an HF-modulated video signal from cable 6, 7 or 8, respectively.

Camera 3 is a conventional video camera having only a triax output port 13' which can be connected to base station 5 via triax cable 8, which is installed in place at a given location, e.g. a sports stadium, schematically represented by a dashed rectangle.

Camera 2 is a conventional video camera having only a fibre-optical output port 14' for connecting to the base station 5 by fibre-optical cable 7, which may or may not be pre-installed at the location.

Both cameras can be used with the base station 5, since its video transceivers 10, 11, 12 are compatible with both types of cable.

Camera 1 comprises a video transceiver 16 according to the invention, having triax and fibre-optical ports 13', 14' for communicating with the base station 5. When used in a location 15 where triax cables are installed, these can be used; outside a building, where there is no pre-installed cable available, camera 1 will preferably be connected to base station 5 by an optical cable, which is lighter in weight than a triax cable and has less range limitations.

Figure 2:
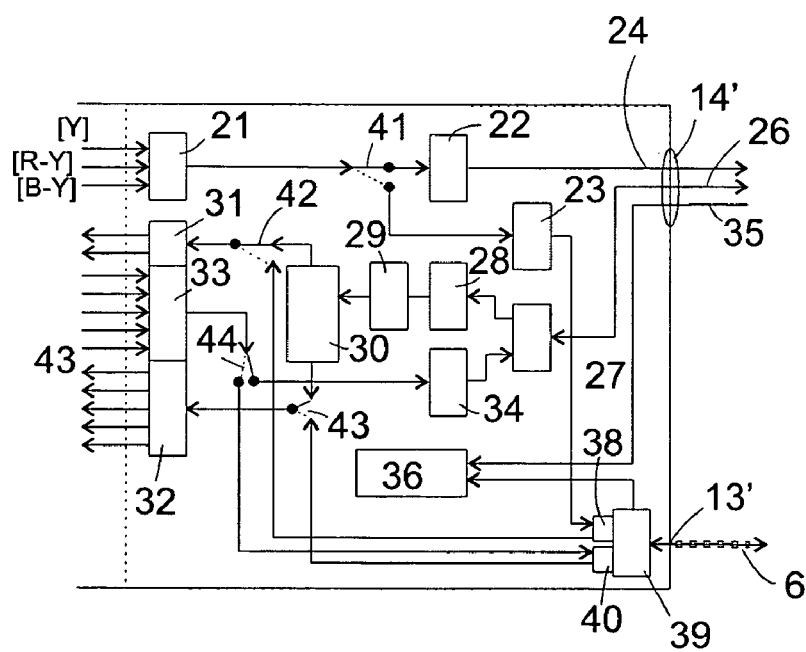
FIG. 2 is a block diagram of an interface unit for a camera.

FIG. 2 gives a schematic outline of the structure of the video interface unit 16 of camera 1. From a camera head, not shown, of camera 1, a digital serializer 21 receives luminance and chrominance signals [Y], [R-Y], [B-Y] of images recorded by the camera head and converts these into a sequence of digital data which are transmitted on a single line as a modulating signal either to a laser 22 or to a frequency modulator 23 via a first switch 41. Coherent light from laser 22 modulated by the serialized data is output via a first optical fibre 24 at fibre-optical port 14'.

Port 14' comprises a second optical fibre 26, which is operated bi-directionally. It is connected to a wavelength division multiplexer 27, which transmits an optical signal at a wavelength of 1310 nm received via fibre 26 to a photo diode 28. The electrical output signal from photo diode 28 transits a gain controlled amplifier 29 where it is adjusted to a pre-defined power level, and reaches a filter 30, where a high frequency component comprising a teleprompter signal is forwarded via a second switch 42. The output signal of filter 30 and the teleprompter signal from switch 42 are provided separately to assigned band filters and AM demodulators, which convert it to the baseband and provide them to the camera head. The band filters and the AM demodulators are symbolised by box 31 in FIG. 2. A low frequency component of the electrical output signal from amplifier 29 is applied to an FM demodulator 32 by filter 30 via a third switch 43, and the demodulator 32 provides a variety of control data, audio signals and a viewfinder signal encoded in this low frequency component to the camera head.

Conversely, control data and audio signals from the camera head are each modulated in an FM modulator onto an electric carrier. Box 33 in FIG. 2 contains five FM modulators and one summing amplifier for this purpose. The output of modulator 33 is connected via a fourth switch 44 to a laser 34 operating at 1550 nm so as to modulate the optical output signal thereof. Multiplexer 27 transmits this modulated optical signal to second fibre 26.

The output of DSB (Double Side Band) modulator 23 is connected to triax port 13' via a first fork 38 and an HP/LP filter 39. The function of the HP/LP filter 39 is to transmit high frequency signals bi-directionally between fork 38 and triax cable 6 connected to port 13', and a low frequency component between cable 6 and a second fork 40. The first fork 38 is further connected to AM demodulator 31, so that the demodulator 31 can receive an input signal from fork 38 instead of from filter 30, if switch 42 is set accordingly. Similarly, the second fork 40 is connected to FM demodulator 32 and FM modulator 33 via switches 43, 44, so that the former can receive a signal to be demodulated from fork 40 instead of from filter 30, and the modulated output signal of the latter can be applied to fork 40 instead of laser 34.

Figure 3:
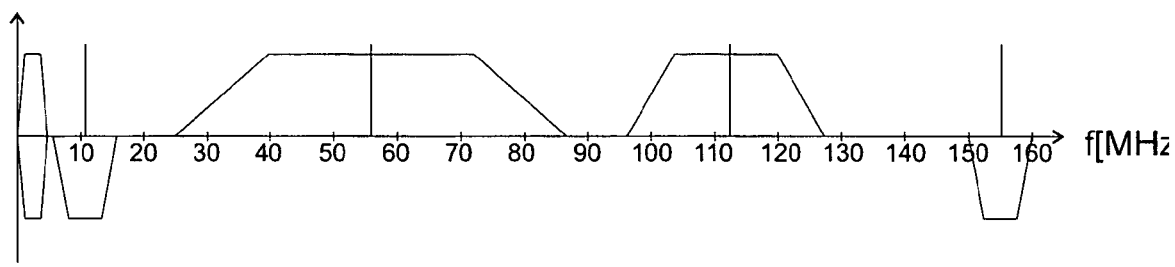
FIG. 3 is a schematic representation of the spectrum of a HDTV signal on a triax cable.

FIG. 3 illustrates the spectrum of the bi-directional signal transmitted on the triax cable 6. The upper portion of the diagram corresponds to "uplink" transmission from camera to base station, the lower one to "downlink" transmission from bast station to camera. In a frequency range below 5 MHz, digital control signals and audio signals are transmitted bi-directionally. A band centred around a carrier frequency of 11 MHz is used for transmitting a viewfinder signal to the camera, which is demodulated in demodulator 32. The frequency range between 20 and 130 MHz is for transmitting the output of frequency modulator 23 to the base station. In this frequency range, there are two bands, one centred around a carrier frequency of 56 MHz and comprising a DSB modulated signal in which the luminance information [Y] is encoded, and another one centred around 112 MHz and comprising the quadrature modulated chrominance information [R-Y], [B-Y]. A band centred around a 156 MHz carrier corresponds to the teleprompter signal.

In the optical cable, fibre 26 carries two counter-propagating light waves at different wave lengths. The downlink light wave is intensity modulated with the 0 to 5 MHz downlink component, the viewfinder and the teleprompter signal shown in FIG. 3, so that after reconversion of the downlink light wave into an electrical signal by photodiode 28 and amplifier 29, these various signal components can be processed in demodulators 31 and 32 just in the same way as the corresponding components of the triax signal.

There are various alternatives for controlling the switches 41 to 44. According to a first alternative, a control circuit, not shown, detects the average output power level of photodiode 28. If the power level is above a predetermined threshold, it is judged that an optical cable is connected to port 14', and the switches are controlled to assume the positions shown in FIG. 2, so that control signals received via fibre line 26 are processed, and the serialized video signal is output on fibre 24. Otherwise, it is judged that no cable is connected to port 14', and the switches are placed in their respective other positions, so as to communicate via triax port 13'.

According to a second alternative, the control circuit is connected to the output of gain controlled amplifier 29 and detects whether a carrier at a predetermined frequency can be retrieved in the output signal from amplifier 29. If it can, the switches are controlled to assume the positions shown in FIG. 2, if not, they are controlled to assume their respective other positions, so that communication via port 13' becomes possible.

The port 14' further comprises an electrical line 35 for providing electrical power to a converter circuit 36 which supplies appropriate operating voltages to the various components of the interface unit and the camera head. Alternatively, converter circuit may receive power from triax port 13' via HP/LP filter 39.

According to a third alternative, the control circuit is simply a relay or the like which is connected to the electric line 35 and holds the switches 41 to 44 in the position of FIG. 2 while a supply voltage is present on line 35.

Figure 4:
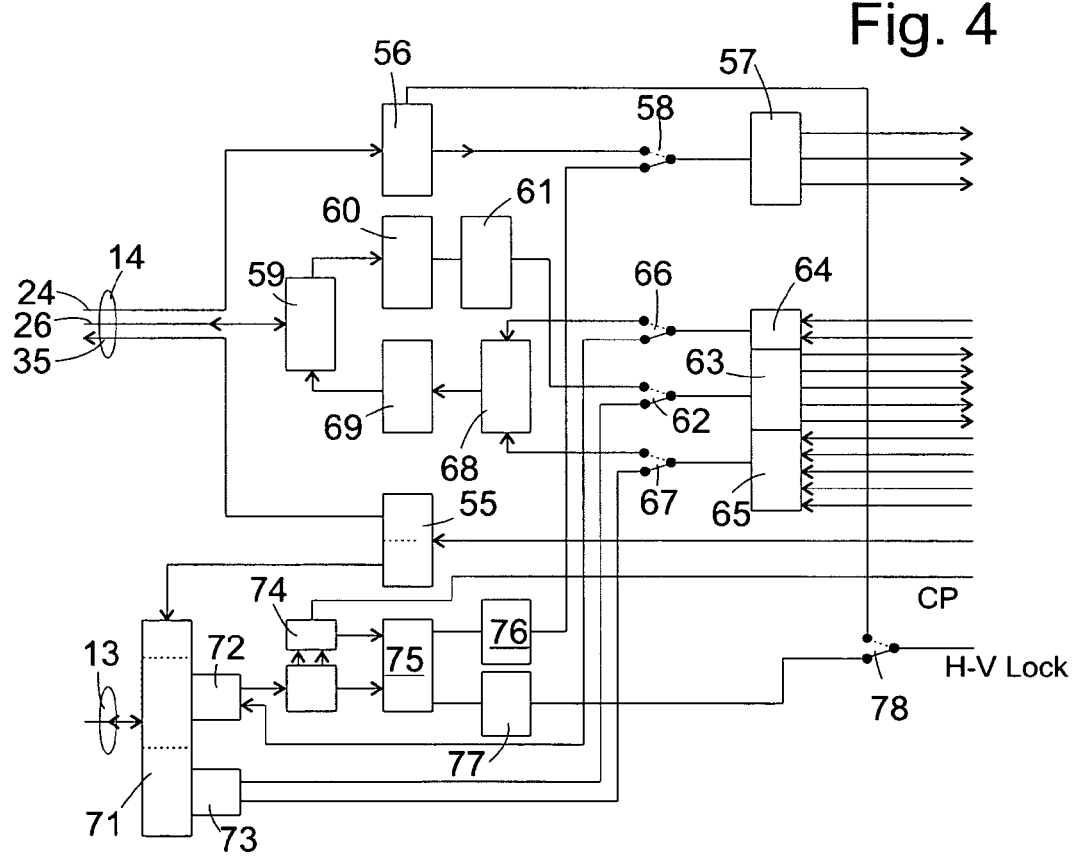
FIG. 4 is a block diagram of an interface unit for a base station.

FIG. 4 is a block diagram of a video signal transceiver 10, 11 or 12 of base station 5. Fibre-optical port 14 comprises two fibre-optical lines 24, 26 and one electrical line 35, respectively, corresponding to and to be connected to identically-numbered lines of camera-side port 14' by a fibre-optical cable 7. Electrical line 35 is connected to a power supply circuit 55 for supplying operating power to a camera located at the other end of fibre-optical cable 7. The first fibre-optical line 24 is a uni-directional line for receiving an optical carrier modulated with the video signal. It is received by optical receiver 56 and converted into a digital signal train in which luminance and chrominance components of the video signal are serially transmitted. A deserializer 57 for restoring a luminance component [Y] and two chrominance components [R-Y], [B-Y] in the same format as provided by the camera head to serializer 21 is connected to receiver 56 by a switch 58.

The circuitry to which the second optical fibre 26 is connected in the interface unit of FIG. 4 corresponds essentially to the one shown in FIG. 2. There is a wavelength division multiplexer 59 directly connected to fibre 26, which transmits a signal received from fibre 26 at a wavelength of 1550 nm to a photo diode 60 where it is converted into an electrical signal. The electrical signal is amplified in automatic gain controlled amplifier 61, the output of which may be connected via switch 62 to FM demodulator 63, where audio and control signals encoded in it are demodulated to the baseband and output to base station 5.

AM modulator 64 and FM modulator 65 modulate viewfinder and teleprompter signals, and various control signals from base station 5 onto electrical carriers two AM and five FM modulated that may be received via switches 66, 67 by HP/LP filter 68, where they are superimposed and supplied as a modulating signal to a laser 69, the modulated output of which is supplied to fibre 26 via multiplexer 59.

At triax port 13, an HP/LP filter 71 with forks 72, 73 is provided, the function of which is complementary to that of components 38 to 40 of FIG. 2. HP/LP filter 71 receives electrical power from power supply circuit 55 and outputs it at triax port 13 as operating power for a camera connected thereto.

The filter 71 extracts luminance and chrominance components from a signal received at triax port 13 and transmits these to a receiver section via fork 72. In the receiver section, an auxiliary receiver 74 retrieves carriers of the luminance and chrominance band and provides these to demodulator 75, which restores baseband luminance and chrominance signals. A serializer 76 arranges these data in a format similar to that output by optical receiver 56 and supplies them to switch 58. A synchronization encoder 77 is provided for extracting horizontal and vertical synchronization information from the baseband video signal output by demodulator 75 and providing a H-V lock signal. Either this signal or a similar signal from optical receiver 56 is supplied to the base station via a switch 78.

As in the case of the camera transceiver, switches 58, 62, 66, 67, 78 are automatically controlled by a control circuit, not shown. According to a first alternative, the control circuit is connected to the output of photodiode 60 and detects based on the average level of the output signal whether a signal source is present at the fibre optical port 14. The same kind of judgement might be done based on an average output level of a photodiode of optical receiver 56.

Alternatively, the control circuit might be adapted to judge the presence of a signal source based on whether a carrier can be retrieved from the output of amplifier 61 or not.

A further alternative would be to judge the presence of the signal source based on whether an H-V-Lock signal is output by optical receiver 56 or synchronization encoder 77.

Finally, the control circuit might judge the presence of a signal source based on whether an electrically load is sensed at triax port 13.

In a default setting of switches 58, 62, 66, 67, 78, deserializer 57 is connected to optical receiver 56, demodulator 63 to amplifier 61, and modulators 64 to 65 to HP-LP filter 68, so as to communicate via the fibre optical port 14. Only if a signal source is positively detected to be present at triax port 13 and no signal source is simultaneously detected at fibre optical port 14, will the switches assume their respective other position and enable communication via the triax port 13.

The invention claimed is:

1. A video signal transceiver having a triax port, a baseband port, a demodulator for converting a HF video signal received at said triax port into a first baseband video signal for outputting at said baseband port and at least one modulator for converting a baseband control signal received at said baseband port into a HF control signal for outputting at said triax port, a fibre-optical port, an optical receiver for converting an optical video signal received at said fibre-optical port into a second baseband video signal, a switch for connecting either said first baseband video signal or said second baseband video signal to a video signal line of said baseband port, and an optical transmitter for transmitting, via said fibre-optical port, an optical control signal derived from said baseband control signal.

2. The transceiver of claim 1, wherein an input of the optical transmitter receives said HF control signal from said at least one modulator.

3. The transceiver of claim 2, further comprising a switch for selectively applying said HF control signal either to said triax port or to said optical transmitter.

4. A video signal transceiver having a baseband port, a triax port, a modulator for converting a baseband video signal received at said baseband port, into a HF video signal for outputting at said triax port and a filter for converting a HF control signal received at said triax port into a first baseband control signal for outputting at said baseband port, a fibre-optical port, an optical transmitter for converting a baseband video signal received at said baseband port into an optical video signal for transmission at said fibre-optical port, an optical receiver for converting an optical control signal received via said fibre-optical port into a second baseband control signal, and a switch for selectively connecting either the first baseband control signal or said second baseband control signal derived from said optical control signal by said optical receiver to at least one demodulator, and said at least one demodulator for converting said output of said switch into a control signal supplied to a control signal line of said baseband port.

5. The transceiver of claim 4, wherein said second baseband control signal from said optical receiver is applied to said at least one demodulator.

6. The transceiver of claim 5, further comprising a switch for selectively applying said baseband video signal either to said modulator or to said optical transmitter.

7. The transceiver of claim 4, comprising signal source detecting means for detecting a signal source connected to said triax port or to said fibre-optical port and for operating the switch so as to establish a signal connection between the baseband port and the one of triax and fibre-optical ports at which the signal is detected.

8. The transceiver of claim 7, wherein the signal source detecting means is adapted to establish the signal connection between the baseband port and a predetermined one of triax and fibre-optical ports if the signal is detected at both the triax port and the fibre-optical port.

9. The transceiver of claim 7, wherein the signal source detecting means comprises a photo-detector connected to said fibre-optical port and judges a signal to be present at the fibre-optical port based on the average optical power received at said photodiode.

10. The transceiver of claim 7, wherein said signal source detecting means comprises carrier detecting means for retrieving a carrier of a modulated signal received at said fibre-optical port and judges a signal to be present at the fibre-optical port based on whether said carrier is retrieved or not.

11. The transceiver of claim 1, comprising signal source detecting means for detecting a signal source connected to said triax port or to said fibre-optical port and for operating the switch so as to establish a signal connection between the baseband port and the one of triax and fibre-optical ports at which the signal source is detected.

12. The transceiver of claim 11, wherein the signal source detecting means is adapted to establish the signal connection between the baseband port and a predetermined one of triax and fibre-optical ports if the signal source is detected at both the triax port and the fibre-optical port.

13. The transceiver of claim 11, wherein the signal source detecting means comprises a photo-detector connected to said fibre-optical port and judges a signal to be present at the fibre-optical port based on the average optical power received at said photodiode.

14. The transceiver of claim 11, wherein said signal source detecting means comprises carrier detecting means for retrieving a carrier of a modulated signal received at said fibre-optical port and judges a signal to be present at the fibre-optical port based on whether said carrier is retrieved or not.

15. The transceiver of claim 14, wherein the fibre-optical port comprises two optical fibre lines, the first one of which is connected to said optical receiver and the second one of which is connected to said carrier detecting means.

16. The transceiver of claim 1, wherein a power supply circuit is connected to said triax port and to an electric line of said fibre-optical port so as to provide electric power to a remote signal source, and a load detecting means is provided for detecting whether an electric load is connected to one of said triax and optical ports and for operating the switch so as to establish a signal connection between the baseband port and the one of triax and fibre-optical ports at which the load is detected.

17. The transceiver of claim 16, wherein the load detecting means is adapted to establish the signal connection between the baseband port and a predetermined one of triax and fibre-optical ports if the signal source is detected at both the triax port and the fibre-optical port.

18. The transceiver of claim 17, wherein said switch is operated by a voltage present at said triax port or at an electric line of said fibre-optical port to establish a signal connection between the baseband port and the one of triax and fibre-optical ports at which the voltage is detected.

19. The transceiver of claim 11 wherein the switch is adapted to establish the signal connection between the baseband port and a predetermined one of triax and fibre-optical ports if the voltage is detected at both the triax port and the fibre-optical port.

* * * * *